United States Patent
Lee et al.

(10) Patent No.: US 8,327,122 B2
(45) Date of Patent: Dec. 4, 2012

(54) METHOD AND SYSTEM FOR PROVIDING CONTEXT SWITCH USING MULTIPLE REGISTER FILE

(75) Inventors: Jae Don Lee, Yongin-si (KR); Keun Soo Yim, Yongin-si (KR); Woon Gee Kim, Yongin-si (KR); Jeong Joon Yoo, Yongin-si (KR); Jung Keun Park, Yongin-si (KR); Chang-Woo Baek, Yongin-si (KR); Chae Seok Im, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 207 days.

(21) Appl. No.: 11/712,998

(22) Filed: Mar. 2, 2007

(65) Prior Publication Data

US 2007/0226474 A1    Sep. 27, 2007

(30) Foreign Application Priority Data

Mar. 2, 2006  (KR) .................. 10-2006-0020115

(51) Int. Cl.
*G06F 15/00* (2006.01)
(52) U.S. Cl. ......................... 712/228; 712/43
(58) Field of Classification Search .............. 712/43, 712/228
See application file for complete search history.

(56) References Cited

U.S. PATENT DOCUMENTS

| | | | | |
|---|---|---|---|---|
| 5,481,734 A * | 1/1996 | Yoshida | ............... | 712/225 |
| 5,652,900 A * | 7/1997 | Yoshida | ............... | 718/100 |
| 5,968,157 A * | 10/1999 | Joy et al. | ............... | 710/200 |
| 6,128,641 A | 10/2000 | Fleck et al. | | |
| 6,128,728 A * | 10/2000 | Dowling | ............... | 712/228 |
| 6,230,230 B1 * | 5/2001 | Joy et al. | ............... | 710/200 |
| 6,272,520 B1 * | 8/2001 | Sharangpani et al. | ......... | 718/108 |
| 6,282,638 B1 * | 8/2001 | Dowling | ............... | 712/228 |

(Continued)

FOREIGN PATENT DOCUMENTS

JP           05-028092           2/1993

(Continued)

OTHER PUBLICATIONS

Peter R. Nuth et al., "The Named-State Register File: Implementation and Performance", Proceedings of the 1st International Symposium on High-Performance Computer Architecture, 1995.

(Continued)

*Primary Examiner* — Aimee Li
(74) *Attorney, Agent, or Firm* — Staas & Halsey LLP (57) ABSTRACT

A context switch method capable of promptly switching a context for a dynamically generated task and a dynamic link by converting a state of multiple register files, switching the context, and separately restoring and storing the context. That is, the context switch method includes: maintaining a multiple register files; establishing the multiple register to be in any one of a prefetch state, a current state, and a store state; converting a state of the multiple register files to be in any one of the prefetch state, the current state, and the store state when a context switch occurs; wherein, in the prefetch state, determining a memory address to read a next task context to be subsequently performed by the register file, in the current state, performing a task with the task context of the register file and in the store state, storing the register file in a memory.

13 Claims, 5 Drawing Sheets

U.S. PATENT DOCUMENTS

| | | | |
|---|---|---|---|
| 6,292,888 B1 * | 9/2001 | Nemirovsky et al. | 712/225 |
| 6,408,325 B1 * | 6/2002 | Shaylor | 718/108 |
| 6,487,654 B2 * | 11/2002 | Dowling | 712/244 |
| 6,529,982 B2 * | 3/2003 | Joy et al. | 710/200 |
| 6,662,297 B1 * | 12/2003 | Boom et al. | 712/245 |
| 6,757,809 B1 * | 6/2004 | Yoshida | 712/33 |
| 6,865,636 B1 | 3/2005 | Hober et al. | |
| 6,868,490 B1 | 3/2005 | Barry et al. | |
| 6,957,323 B2 * | 10/2005 | Song | 712/217 |
| 7,146,489 B2 * | 12/2006 | Dowling | 712/207 |
| 7,213,137 B2 * | 5/2007 | Boom et al | 712/245 |
| 7,272,703 B2 * | 9/2007 | Dowling | 712/225 |
| 7,383,393 B2 * | 6/2008 | Al Sukhni et al. | 711/137 |
| 7,434,004 B1 * | 10/2008 | Spracklen et al. | 711/137 |
| 7,610,473 B2 * | 10/2009 | Kissell | 712/235 |
| 7,624,257 B2 * | 11/2009 | Kra | 712/228 |
| 2002/0052993 A1 * | 5/2002 | Dowling | 710/260 |
| 2003/0051124 A1 * | 3/2003 | Dowling | 712/244 |
| 2003/0070021 A1 * | 4/2003 | Joy et al. | 710/200 |
| 2004/0128475 A1 * | 7/2004 | Sheaffer | 712/32 |
| 2004/0153634 A1 | 8/2004 | Barry et al. | |
| 2005/0120194 A1 * | 6/2005 | Kissell | 712/242 |
| 2006/0155973 A1 * | 7/2006 | Soltis | 712/228 |
| 2006/0253690 A1 * | 11/2006 | Chen et al. | 712/241 |
| 2006/0277396 A1 * | 12/2006 | Renno et al. | 712/228 |
| 2007/0055852 A1 * | 3/2007 | Hanes et al. | 712/228 |

FOREIGN PATENT DOCUMENTS

| | | |
|---|---|---|
| JP | 6-83639 | 3/1994 |
| JP | 10-207717 | 8/1998 |
| JP | 2001-0070469 | 7/2001 |
| JP | 2003-150390 | 5/2003 |
| JP | 2005-78450 | 3/2005 |
| KR | 10-0259597 | 3/2000 |

OTHER PUBLICATIONS

Carl a. Waldspurger et al., "Register Relocation: Flexible Contexts for Multithreading" Proceedings of the 20$^{th}$ Annual International Symposium on Computer Architecture, May 1993.

Volker Barthelmann, "Inter-Task Register-Allocation for Static Operating Systems" Proceedings of the Joint Conference on Languages, Compilers and Tools for Embedded Systems & Software and Compilers for Embedded Systems, Jun. 2002.

Korean Office Action issued on Apr. 24, 2007 in corresponding Korean Patent Application No. 10-2006-0020115.

Korean Notice of Allowance issued on Oct. 10, 2007 in corresponding Korean Patent Application No. 10-2006-0020115.

* cited by examiner

METHOD AND SYSTEM FOR PROVIDING CONTEXT SWITCH USING MULTIPLE REGISTER FILE

CROSS-REFERENCE TO RELATED APPLICATIONS

This application claims the benefit of Korean Patent Application No. 10-2006-0020115, filed on Mar. 2, 2006, in the Korean Intellectual Property Office, the disclosure of which is incorporated herein by reference.

BACKGROUND OF THE INVENTION

1. Field of the Invention

The present invention relates to a context switch method, and more particularly, to a context switch method capable of promptly switching a context for a dynamically generated task and a dynamic link by converting a state of multiple register files, switching the context, and separately restoring and storing the context, and a system using the method.

2. Description of the Related Art

Recently, with development of computing technology, use of a real-time operating system (RTOS) in an embedded system has become widely spread. In the RTOS, a multi tasking function is essential, so that a function for a context switch of multiple registers are required in a processor, such as a microcontroller, a digital signal processor (DSP) and the like. Accordingly, a prompt context switch is an essential key for an effectiveness of the RTOS. Since most time required for the context switch is spent storing or restoring the multiple registers, a prompt context switch method reducing time required for storing or restoring the multiple registers is required.

Also, according to a conventional art, a number of registers used by a task is analyzed and determined before use, and a register file is divided by the number of registers. Namely, in the conventional art, the register file is organized by each of the tasks.

Figure 1:
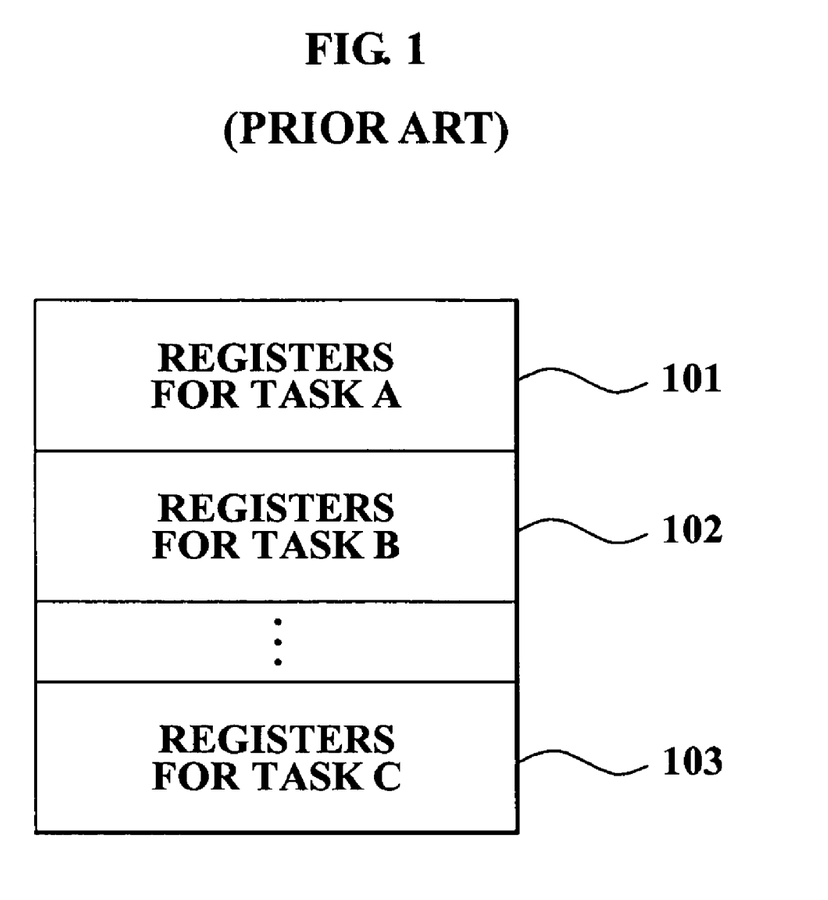
FIG. 1 is a diagram illustrating an embodiment dividing a register file by each task in the conventional art.

FIG. 1 is a diagram illustrating an example of dividing a register file by each task in the conventional art. Referring to FIG. 1, in a context switch system in the conventional art, the register file is divided into a register 101 for task A, a register 102 for task B and register 103 for task C.

According to the conventional art, a greater storage capacity for the register file is required since the register file is divided by each task.

Also, a required register is unaware of when an operating system (OS) function is used since an entire context used by the task is statically determined, and a static register is not able to be used and analyzed when a new code is used by a dynamic library or when a function pointer is used. Also, the entire context is allocated to a temporary/temporarily used register.

Accordingly, in order to solve the problems of the conventional art, a prompt context switch system capable of being applicable to a dynamically generated task and a dynamic link is required.

SUMMARY OF THE INVENTION

Additional aspects and/or advantages of the invention will be set forth in part in the description which follows and, in part, will be apparent from the description, or may be learned by practice of the invention.

An aspect of the present invention provides a context switch method capable of preventing a memory bus from being suddenly used by including multiple register files and individually establishing a state for each of the multiple register files, and provides a prompt context switch method by separately performing restoring and storing of a context, and a system using the method.

An aspect of the present invention also provides a context switch method capable of allocating a register file for a dynamically generated task and a dynamic link and performing the task, when switching the context, since a prefetch operation, reading a task context beforehand, is performed by establishing one register file of the multiple register files as the prefetch register file, and predicting the next task to be subsequently performed, and a system using the method.

An aspect of the present invention also provides a context switch method capable of increasing task performing speed by converting a store register file into a current state, when the next task context to be subsequently performed is stored in the store register file after a context switch occurs, and a system using the method.

An aspect of the present invention also provides a context switch method capable of effectively using a memory bus without causing degradation to the context switch performance of a central processing unit (CPU) since a storing operation of a store register file is performed and a prefetching operation of a prefetch register file is performed when a memory bus is idle when the memory bus is determined to be idle, and a system using the method.

According to an aspect of the present invention, there is provided a context switch method including: maintaining a multiple register files; establishing the multiple register files to be in any one of a prefetch state, a current state, and a store state; converting a state of the multiple register files to be in any one of the prefetch state, the current state, and the store state when a context switch occurs; wherein, in the prefetch state, determining a memory address to read a next task context to be subsequently performed by the register file, in the current state, performing a task with the task context of the register file, and in the store state, storing the register file in a memory.

According to another aspect of the present invention, there is provided a context switch system including: a memory interface module establishing the multiple register files to be in any one of a prefetch state, a current state, and a store state and converting the state of the multiple register files to be in any one of a prefetch state, a current state, and a store state when a context switch occurs, wherein the memory interface module enables the register file in the prefetch state to determine a memory address to read for a next task context to be subsequently performed, and a CPU performs a task with the task context of the register file in the current state and the register file in the store state is stored in a memory.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
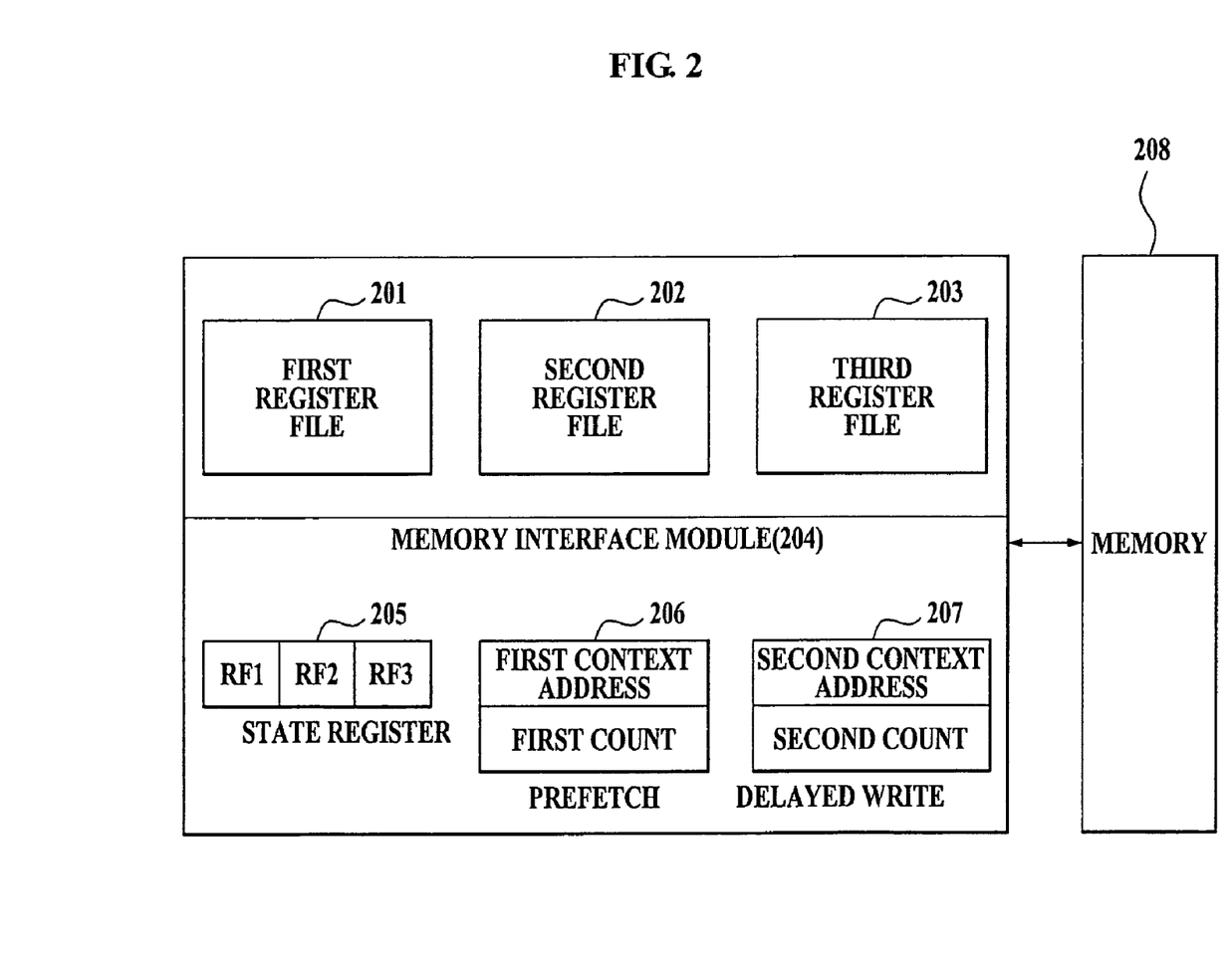
FIG. 2 is a diagram illustrating a configuration of a context switch system according to an embodiment of the present invention.

FIG. 2 is a diagram illustrating a configuration of a context switch system according to an embodiment of the present invention.

Referring to FIG. 2, the context switch system according to an embodiment of the present invention includes a first register file 201, a second register file 202 and a third register file 203.

The register files, the first register file 201, the second register file 202 and the third register file 203, are established in any one of a prefetch register file (PRF), a current register file (CRF) and a store register file (SRF). The PRF is a type of a register assembly predicting a next task context by reading the next task to be subsequently performed. The CRF 202 is a type of register file in which a CPU (not shown) performs an operation with a current task context. The SRF 203 is a type of an old register assembly used by a prior task to be stored when switching the context.

A memory interface module 204 stores a register file, performs the task, and restores the register files by interoperating with the CPU and a memory 208. The memory interface module 204 records each state of the register files in a state register 205.

Hereinafter, the reading of the task context by predicting the next task to be subsequently performed will be described as a prefetch operation, the performing the operation with the current task context will be described as a current operation and a storing the old register assembly used by the prior task when switching the context as a store operation.

In each register file, the prefetch operation, the current operation, the store operation are sequentially performed, a state of each of the register files is recorded in the state register 205. As an example, when the register file is in a prefetch state, "1" may be established, when the register file is in a current state, "0" may be established and when the register file is in a store state, "2" may be established.

The each state of the register file changes whenever a context switch occurs, the context switch system of the present invention may convert a state of the register files by controlling a MUX/DEMUX (not shown) according to a value stored in the state register 205.

The context switch system according to an embodiment of the present invention includes a first context address and a first count register 206 for the prefetch operation, and a second context address and a second count register 207 for the store operation.

Figure 3:
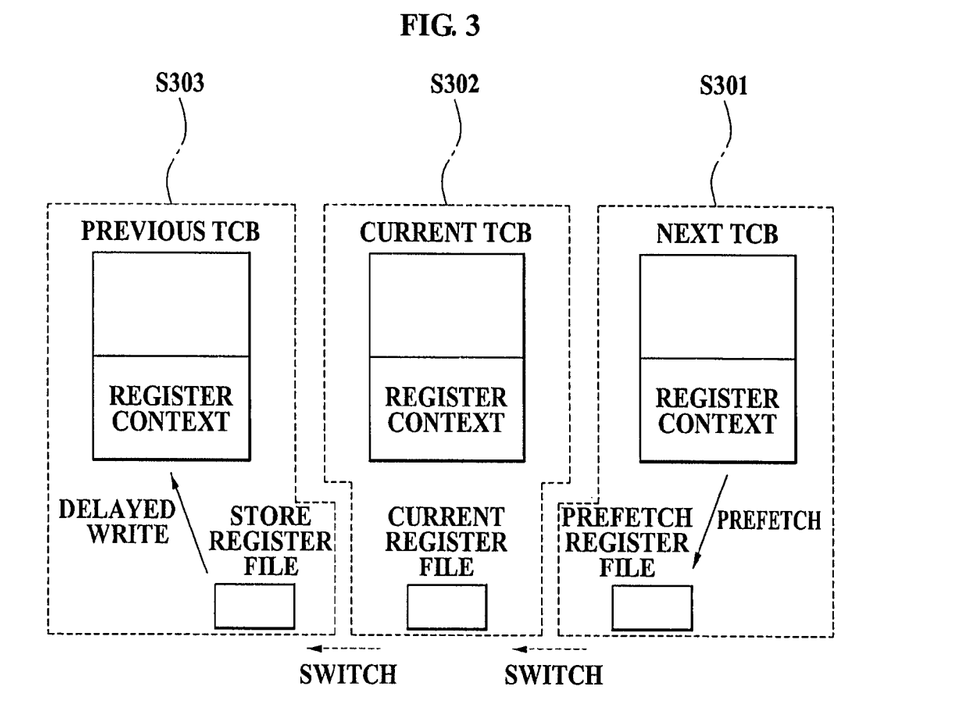
FIG. 3 is a diagram illustrating an embodiment of a task performing order performed in each register file according to an embodiment of the present invention.

FIG. 3 is a diagram illustrating an embodiment of a task performing order performed in each register file according to an embodiment of the present invention.

Referring to FIG. 3, according to an embodiment of the present invention a register file completes the task by sequentially performing a first operation S301 performing the prefetch operation, a second operation S302 performing the current operation, and a third operation S303 performing the store operation. In this case, each operation proceeds to a subsequent operation when a context switch occurs.

When the prefetch operation S301 is performed in the prefetch register file, according to an embodiment of the present invention the context switch system records a starting number of the memory address to read a next task context to be subsequently performed in the first context address register 206, and establishes a value of the state register as "1".

Also, when the current operation S302 is performed in the current register file, the context switch system establishes a value of the state register as "0".

Also, when the store operation S303 is performed in the store register file, the context switch system records a starting number of the memory address to read a next task context to be subsequently performed in the second context address register 206 and establishes a value of the state register as "2".

On the other hand, an embodiment of the present invention includes multiple register files and maintains each state of the multiple register files in a different state.

Namely, when a first register file is in a current state, a second register file and a third register file are maintained in a prefetch state and in a store state, respectively. When a context switch occurs, the first register file is converted into the store state, the second register file is converted into the current state, and the third register file is converted into the prefetch state. Also, when the context switch repeatedly occurs, the first register file is converted into the prefetch state, the second register file is converted into the store state and the third register filed is converted into the current state.

Thus, according to an aspect of the present invention, a memory bus is not suddenly used by multiple register files, independently establishing a state of each of the multiple register files is performed, and a prompt context switch is possible by separately performing restoring and storing of the context.

Also, according to an embodiment of the present invention, a task is able to be performed by allocating a register file for a dynamically generated task and a dynamic link, and when the context switch occurs, by establishing one register file of the multiple register files as the prefetch register file and performing a prefetch of reading the task context beforehand by predicting the next task to be subsequently performed.

Figure 4:
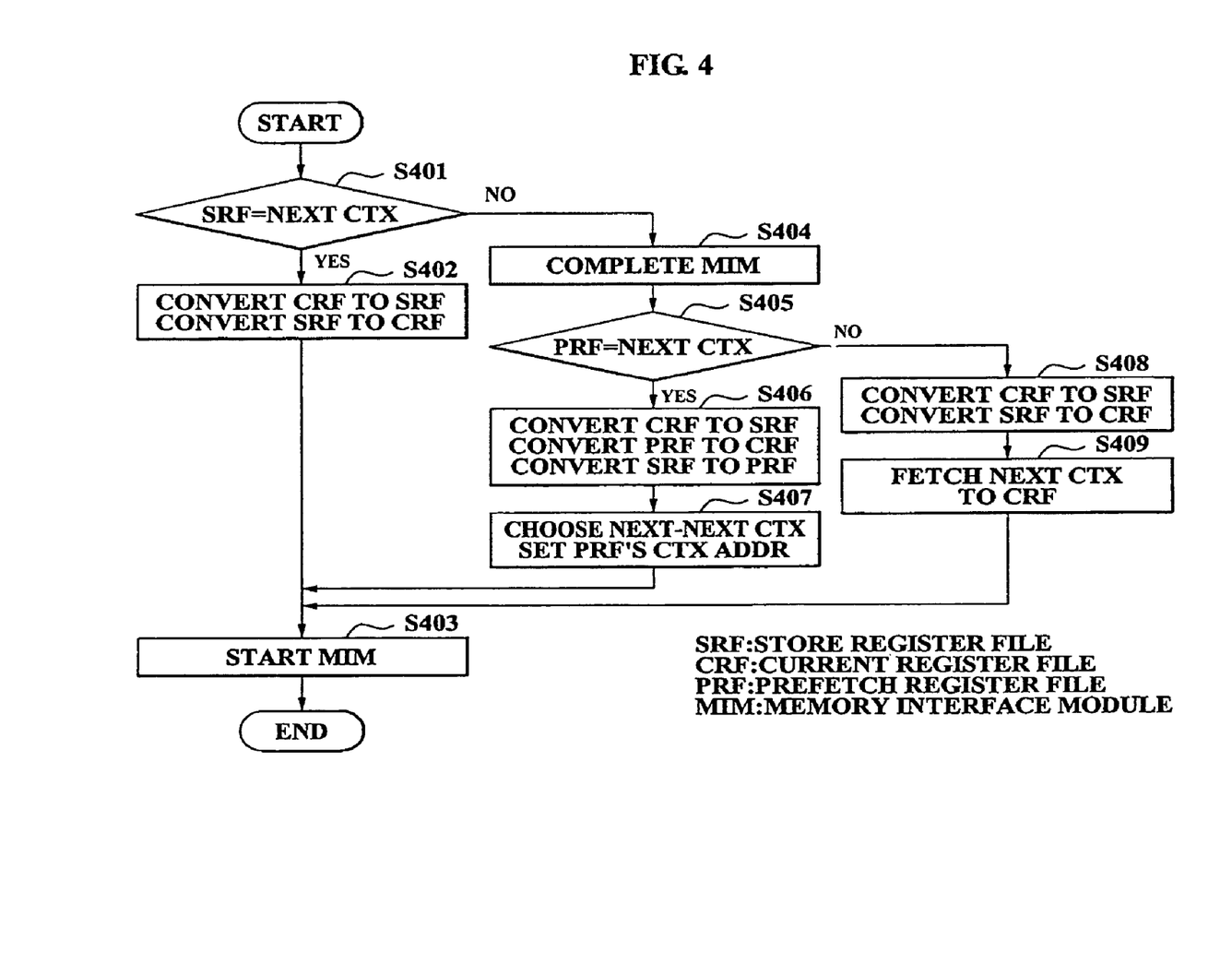
FIG. 4 is a flowchart illustrating converting procedures of a state of a register file according to an embodiment of the present invention.

Also, according to an embodiment of the present invention, when a next task context to be subsequently performed is stored in a store register file after a context switch, there is no need to read the task context by converting the store register file into the current state. Referring to FIG. 4, this case will be illustrated below.

FIG. 4 is a flowchart illustrating converting procedures of a state of a register file according to an embodiment of the present invention. Referring to FIG. 4, when the context switch occurs in operation S401, a context switch system determines whether a subsequent task context is stored in a store register file.

When the subsequent task context is stored in the store register file as a result of the determining in operation S401, the context switch system converts the store register file into a current state in operation S402. The converting into the current state is possible by establishing a state register as a zero.

The context switch system in operation S402 converts the current register file into a store state. The converting into the store state is possible by establishing the state register as a two. In this case, a memory address to store the context is recorded in a second context address register 207, and a second count is established as a zero.

The stated register is established as a one by repeatedly establishing a remaining register file of among three register files as a prefetch state, a first count is established as a zero by storing a context address of a next task in a first context address register 206.

In operation S403, the context switch system performs a task in a state that the register files are converted to, by operating a memory interface module.

When the next task context is not stored in the store register file as a result of the determining in operation S401, the context switch system performs the next task by operating the memory interface module in operation S404, and determines whether the next task context is stored in the prefetch register file in operation S405.

When the next task context is stored as a result of the determining in operation S405, the current register file is converted into the store state, a prefetch register file is converted into a current state, and a store register file is converted into a prefetch state in operation S406, and in operation S407, a context address of the prefetch register file in the first context address register is chosen to determine a further next task context.

When the context of the further next task is not stored in the prefetch register file as a result of the determining in operation S405, the context switch system converts the current register file is converted into a store register file, and the store register file is converted into a current register file in operation S408, and the current register file fetches the context of the next task in operation S409, according to the result of the prefetch register file with the context of the next task (S405).

Consequently, according to an aspect of the present invention, after the context switch occurs, when the next task context is stored in the store register file, speed of performing the task increases by converting the store register file to the current state.

Also, according to an aspect of the present invention, a task is performed by converting a state of multiple register files, so that a memory bus needs to be effectively used.

Figure 5:
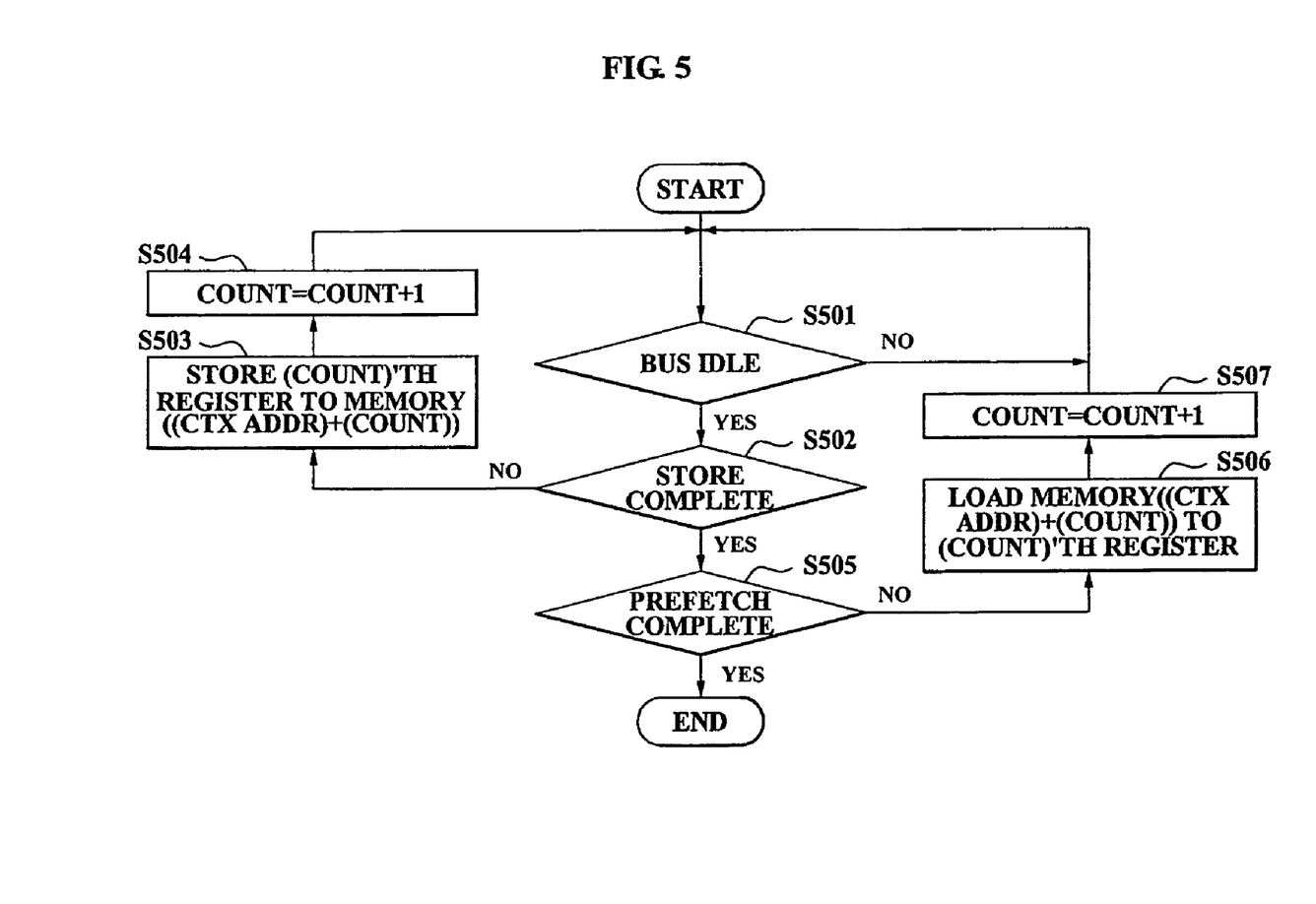
FIG. 5 is a flowchart illustrating an operation procedure of a memory interface module according to an embodiment of the present invention.

Accordingly, a memory interface module, according to an embodiment of the present invention, determines whether the memory bus is used, and when the memory bus is idle, stores an old register assembly used by a prior task in a memory 208, and prefetches a next task context to be performed by predicting the next task context.

FIG. 5 is a flowchart illustrating an operation procedure of a memory interface module according to an embodiment of the present invention. Referring to FIG. 5, a context switch system according to an embodiment of the present invention determines whether a memory bus is used in operation S501. As a result of the determination in operation S501, when the memory bus is idle, the context switch system according to an embodiment of the present invention determines whether a storing operation is completed in a store register file in operation S502.

As a result of the determination in the operation S502, when the storing operation is not completed in the store register file, the context switching system, in operation S503, performs storing by storing the $N^{th}$ register which is recorded in the second count 207, i.e. a context address+N, in a memory address. Next, in operation S504, the context switch system records a count by adding a one to the second count and again determines whether the memory bus is used in the operation S501.

As a result of the determination in the operation S502, when the storing operation is completed in the store register file, the context switch system determines whether the prefetching operation in a prefetch register file is completed in operation S505, and when the prefetching operation is not completed, the context switch system loads a task context recorded in the memory 208, i.e. context address+M, in the $M^{th}$ register which is recorded in the first count 206 in operation S506, records a count by adding a one to the first count, and again determines whether the memory bus is used in operation S501.

Accordingly, the present invention determines whether the memory bus is idle, and when the memory bus is idle, the storing operation of the store register file or the prefetching operation of the prefetch register file is performed, therefore the present invention provides a context switch method capable of effectively using the memory bus without causing any decrease in a context switch performance of a CPU since the storing operation of the store register file, and the prefetching operation of the prefetch register file, are performed when a memory bus is idle by determining whether the memory bus is idle.

The context switch method according to the above-described embodiment of the present invention may be recorded in computer-readable media including a program instruction for executing various operations realized by a computer. The computer-readable medium may include a program instruction, a data file, and a data structure, separately or cooperatively. The program instructions and the media may be those specially designed and constructed for the purposes of the present invention, or they may be of the kind well known and available to those skilled in the art of computer software arts. Examples of the computer-readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level language codes that may be executed by the computer using an interpreter. The hardware elements above may be configured to act as one or more software modules for implementing the operations of this invention. (common usage)

Accordingly, an aspect of the present invention provides a context switch method capable of preventing a memory bus being suddenly used by including multiple register files and individually establishing a state for each of the multiple register files, and provides a prompt context switch method by separately performing restoring and storing of a context.

Also, an aspect of the present invention provides a context switching method capable of allocating a register file for a dynamically generated task and a dynamic link and performing the task, when switching the context, since a prefetch operation, reading a task context beforehand, is performed by establishing one register file of the multiple register files as the prefetch register file, and predicting the next task to be subsequently performed and a system using the method.

Also, an aspect of the present invention provides a context switch method capable of increasing task performing speed by converting a store register file into a current state, when the next task context to be subsequently performed is stored in the store register file after a context switch occurs, and a system using the method.

Also, an aspect of the present invention also provides a context switch method capable of effectively using the memory bus without causing degradation to the context switch performance of a CPU since a storing operation of a store register file, and a prefetching operation of a prefetch register file, are performed when a memory bus is idle by determining when the memory bus is determined to be idle, and a system using the method.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A context switch method comprising:
converting a state of multiple register files to be in any one of a prefetch state, a current state, and a store state when a context switch occurs; wherein, in the prefetch state, determining a memory address to read a predicted next task context to be subsequently performed, in the current state, performing a task with a task context of a register file, and in the store state, storing the register file in a memory to identify a next task context to be subsequently performed,
wherein when a context switch occurs, the converting of the state of the multiple register files to be in any one of the prefetch state, the current state, and the store state comprises:
determining, when the context switch occurs, whether a next task context switch to be subsequently performed is stored in the store state of the multiple register files; and
converting, when the determination indicating that the next task context is stored in the store state, the register file in the store state into a current state and the register file in the current state into a store state.

2. The context switch method of claim 1, wherein the prefetch state comprises recording a starting number of the memory address to read a next task context to be subsequently performed by the register file in a first context address register.

3. The context switch method of claim 1, wherein the store state comprises recording a starting number of a memory address in a second context address register.

4. The context switch method of claim 1, further comprising:
recording state information of the multiple register files in a state register; and
updating a state information of the multiple register files in the state register by changing the state information when a state of the multiple register files is converted.

5. The context switch method of claim 1, wherein a state of each of the multiple register files is independently established.

6. The context switch method of claim 1, further comprising:
storing the register file in the store state in the memory or determining the memory address to read the next task context to be subsequently performed in the register file in the prefetch state, when a memory bus is determined to be idle.

7. A non-transitory computer-readable storage medium storing a program for implementing a method of maintaining multiple register files, the method comprising:
converting a state of the multiple register files to be in any one of a prefetch state, a current state, and a store state when a context switch occurs; and
wherein, in the prefetch state, determining a memory address to read a predicted next task context to be subsequently performed by a register file, in the current state, performing a task with a task context of the register file, and in the store state, storing the register file in a memory to identify a next task context to be subsequently performed,
wherein when a context switch occurs, the converting of the state of the multiple register files to be in any one of the prefetch state, the current state, and the store state comprises:
determining, when the context switch occurs, whether a next task context switch to be subsequently performed is stored in the store state of the multiple register files; and
converting, when the determination indicating that the next task context is stored in the store state, the register file in the store state into a current state and the register file in the current state into a store state.

8. A context switch system comprising:
a memory interface module to establish of multiple register files to be in any one of a prefetch state, a current state, and a store state and to convert a state of the multiple register files to be in any one of a prefetch state, a current state, and a store state when a context switch occurs,
wherein the memory interface module enables a register file in the prefetch state to determine a memory address to read for a predicted next task context to be subsequently performed, and a CPU performs a task with a task context of the register file in the current state and the register file in the store state is stored in a memory to identify a next task context to be subsequently performed,
wherein the memory interface module determines, when the context switch occurs, whether a next task context switch to be subsequently performed by the register file among the multiple register files is stored, and converts, when the determination indicating that the next task context is stored, the register file in the store state into the current state and the register file in the current state into the store state.

9. The context switch system of claim 8, wherein the memory interface module records a starting number of the memory address to read a next task context to be subsequently performed by the register file in a first context address register.

10. The context switch system of claim 8, wherein the store state comprises recording a starting number of the memory address to read a next task context to be subsequently performed by the register file in a second context address register.

11. The context switch system of claim 8, wherein the memory interface module records state information of the multiple register files in a state register; and updates a state information of the multiple register files in the state register by changing the state information when a state of the multiple register files is converted.

12. The context switch system of claim 8, wherein the memory interface module establishes each of the multiple register files in a different state independently.

13. The context switch system of claim 8, wherein the memory interface module, when a memory bus is idle, stores the register file in the store state in the memory, or determines the memory address to read the next task context switch to be subsequently performed in the register file in the prefetch state.

* * * * *

UNITED STATES PATENT AND TRADEMARK OFFICE
CERTIFICATE OF CORRECTION

PATENT NO. : 8,327,122 B2  
APPLICATION NO. : 11/712998  
DATED : December 4, 2012  
INVENTOR(S) : Jae Don Lee et al.

Page 1 of 1

It is certified that error appears in the above-identified patent and that said Letters Patent is hereby corrected as shown below:

In the Claims:

Column 8, Line 22, In Claim 8, delete "of multiple" and insert -- multiple --, therefor.

Signed and Sealed this
Fourteenth Day of May, 2013

Teresa Stanek Rea
*Acting Director of the United States Patent and Trademark Office*